United States Patent [19]

Brownscombe

[11] 4,359,589

[45] Nov. 16, 1982

[54] PROCESS FOR MAKING LINEAR POLYETHERS

[75] Inventor: Thomas F. Brownscombe, Houston, Tex.

[73] Assignee: Shell Oil Company, Houston, Tex.

[21] Appl. No.: 287,394

[22] Filed: Jul. 27, 1981

[51] Int. Cl.³ .................................................. C07C 41/03
[52] U.S. Cl. ........................................ 568/618; 568/607;
568/608; 568/619; 568/620; 568/625; 568/867
[58] Field of Search ............... 568/607, 608, 609, 618,
568/619, 620, 867, 625

[56] References Cited

U.S. PATENT DOCUMENTS

| | | | |
|---|---|---|---|
| 3,359,217 | 12/1967 | Brandner | 568/620 |
| 3,850,856 | 11/1974 | Dreyfus | 568/620 |
| 3,969,417 | 7/1976 | Umbach et al. | 568/618 |
| 4,112,231 | 9/1978 | Weibull | 568/607 |
| 4,282,387 | 8/1981 | Olstowski et al. | 568/608 |

*Primary Examiner*—Howard T. Mars
*Attorney, Agent, or Firm*—Dean F. Vance

[57] ABSTRACT

An improved process for making linear polyethers having a relatively narrow molecular weight distribution comprises contacting a monoepoxide with a salt selected from the group consisting of fluoborate, fluophosphate, fluoantimonate and fluoarsenate salts of a metal selected from the group consisting of alkali metals, alkaline earth metals, lead, nickel, aluminum, cadmium, cobalt, tin, zinc and copper in the presence of a hydroxyl-containing compound at a controlled temperature of about $-78°$ C. to less than $+20°$ C. and in the absence of any additional acid.

14 Claims, No Drawings

PROCESS FOR MAKING LINEAR POLYETHERS

BACKGROUND OF THE INVENTION

1. Field of the Invention

This invention is directed to a process for the production of linear polyethers of high molecular weight and a narrow molecular weight distribution, starting with 1,2 monoepoxides.

2. Description of the Prior Art

Linear polyethers are important articles of commerce and are used, for example, as surface-active agents, lubricants, vehicle bases in cosmetic and pharmaceutical formulations, mold release agents, plasticizers, softeners, antistats and intermediates for synthesis. These polyethers are typically prepared from monoepoxides such as propylene oxide and ethylene oxide.

One process for preparing polymers of alkylene oxides is disclosed in U.S. Pat. No. 2,293,868. In this patent, 1,2-alkylene oxides are polymerized at a temperature of $+20°$ C. to about $150°$ C. in the presence of an acidic compound of fluorine, such as the complex compound of boron trifluoride and diethyl ether. However, the polymers produced by this process have a relatively low molecular weight and the necessary reaction time is relatively long, e.g., several hours. Further, the reaction product contains large amounts of unwanted by-products such as dioxane and low molecular weight polyols. What is needed is a process to produce linear polyethers of acceptable molecular weight and purity in a relatively short reaction time.

SUMMARY OF THE INVENTION

The present invention broadly encompasses an improved process for preparing linear polyethers of the general formula. $R'O(C_2H_2R_1R_2O)_nH$. Significantly, the process is selective to the preparation of linear polyethers having a relatively narrow molecular weight distribution, i.e., a ratio of weight average molecular weight to number average molecular weight of less than about 1.5. In particular, the process comprises the following steps:

(a) adding a salt selected from the group consisting of fluoborate, fluophosphate, fluoantimonate and fluoarsenate salts of metals to a reaction zone maintained at a temperature of about $-78°$ C. to less than $+20°$ C. in the presence of a hydroxyl-containing compound and in the absence of any additional acid;

(b) contacting a 1,2-monoepoxide with said salt and said hydroxyl-containing compound in said reaction zone, therein forming said linear polyethers; and (c) recovering said linear polyethers.

In a specific embodiment the metal salt is selected from the group consisting of fluoborate, fluophosphate, fluoantimonate and fluoarsenate salts of a metal selected from the group consisting of alkali metals, alkaline earth metals, lead, nickel, aluminum, cadmium, cobalt, tin, zinc and copper.

It is expected that polyether copolymers may be prepared by contacting the salt catalyst with two or more dissimilar monoepoxides. Likewise, block copolymer polyethers may be prepared by the sequential addition of two or more dissimilar monoepoxides.

The reaction equation for the process contemplated herein can be represented as follows:

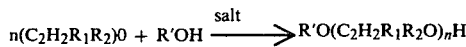

where the $(C_2H_2R_1R_2)O$ group represents n oxide units in a chain connected by ether linkages. The R'OH compound is termed the initiator and is selected from the group consisting of ethers, alcohols and water.

As shown in the Illustrative Embodiments which follow, the process according to the present invention results in the preparation of linear polyethers having molecular weights up to over about 2,000 and a "Q" value less than about 1.5. Still further, the process is very selective to the linear polyether and high yields of polymer are obtained, i.e., the process produces very low amounts of dioxane and other unwanted by-products such as cylic polyethers. In addition, the reaction rate is relatively fast, which rate is particularly surprising in view of the relatively low reaction temperatures which are required.

DETAILED DESCRIPTION OF THE INVENTION

In the present process the 1,2 monoepoxides are contacted with a catalytic amount of a particular salt in the absence of any additional acid. The most critical aspects of the present invention are the selection of the particular salt catalyst and the reaction temperature.

The term "1,2-monoepoxide" as used in the specification and claims refers to monomers of the general formula

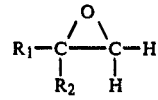

where $R_1$ and $R_2$ are hydrogen, alkyl, aryl or alkylaryl groups. Preferably, $R_1$ and $R_2$ are hydrogen or a nonsubstituted hydrocarbon group having less than 20 carbon atoms. More preferably $R_1$ and $R_2$ are hydrogen or a nonsubstituted hydrocarbon group having less than 10 carbon atoms. Specific examples of suitable monoepoxides include ethylene oxide, propylene oxide, isobutylene oxide, octene-1 oxide and styrene oxide. A much preferred group of monoepoxides includes ethylene oxide, propylene oxide and isobutylene oxide, with ethylene oxide being most preferred. Another preferred group include octene-1 oxide, styrene oxide and phenyl glycidyl ether.

The hydroxyl-containing compound (also called an "initiator") employed in the process is preferably selected from the group consisting of ethers, alcohols and water. An example of a specific ether is ethylene glycol monoethyl ether. Examples of specific alcohols include ethyl alcohol and dodecyl alcohol. In a preferred embodiment the hydroxyl-containing compound is selected from the group consisting of ethylene glycol monoethyl ether and water, with ethylene glycol monoethyl ether being most preferred.

Preferably, the molar ratio of hydroxyl-containing compound to salt is about 40:1 to about 1:5, preferably about 1:1.

The salt is employed in the present invention as the sole catalyst. No additional catalyst or acid is employed. The salt employed herein is preferably selected from the group consisting of fluoborate, fluophosphate, fluoantimonate and fluoarsenate salts of alkali metals, alkaline earth metals, lead, nickel, aluminum, cadmium, cobalt, tin, zinc and copper. The alkali metals are metals of Group 1A and include lithium, sodium, potassium, rubidium, cesium and francium. The alkaline earth metals are metals of Group II A and include magnesium, calcium, barium, strontium and radium. Magnesium is the much preferred alkaline earth metal. Of the five preferred metals—zinc, magnesium, aluminum, tin and calcium—zinc is most preferred. Of the anions, fluoborate is most preferred. Accordingly, the most preferred salt is zinc fluoborate.

An important consideration in the selective preparation of predominately linear polyethers is the reaction temperature. The reaction temperature must be maintained at a temperature of about $-78°$ C. to less than $+20°$ C., preferably about $-50°$ C. to about $+10°$ C. Below about $-78°$ C. there is either no reaction or very slow reaction. Above $+20°$ C., the reaction product contains significant amounts of cyclic polyethers. Accordingly, control of reaction temperature is critical. One convenient way of controlling the reaction temperature is by controlling the rate of addition of the monoepoxide, i.e., fast addition rates result in higher temperatures than do lower addition rates.

The amount of salt catalyst employed in the process is generally between about 0.02 mole percent and about 5.0 mole percent based on the amount of monoepoxide. Preferably the amount of salt catalyst is between about 0.1 mole percent and about 0.5. More catalyst could be used if desired, but is not necessary. A significant aspect of the present invention is the very low amount of salt catalyst employed compared to, for example, the high level of catalyst employed in producing polyethers in U.S. Pat. No. 3,997,563 and the fact that the salt is the catalyst here. The prior art clearly states that a strong acid catalyst such as $BF_3$ or $HBF_4$ is required for the reaction. The data presented herein clearly proves that the prior art is incorrect. While it is well known that strong acids may polymerize ethylene oxide (see, e.g., Fieser and Fieser, Advanced Organic Chemistry, Reenhold, 1961, pp. 282–283 and previously cited patents), there is no prior indication in the art to suggest the unobvious catalysis of such reactions by neutral salts such as the catalysts described herein.

A convenient method for recovering the linear polyether is by flashing off the unreacted monoepoxide, however, other methods of recovery may also be employed.

The reaction may be carried out in a continuous, semi-continuous or batch process. Semi-continuous operation means that the initiator and catalysts are charged into the reactor and the monoepoxide is added continuously until the desired molecular weight is attained; then the reaction is stopped, and the contents of the reactor is withdrawn. The semi-continuous operation is the preferred mode of operation.

When employing the semi-continuous process scheme, an important consideration in the selective preparation of predominantely linear polyethers is the rate of addition of the monoepoxide to the reaction zone. A relatively slow rate of monoepoxide addition, for example, favors the preparation of linear polyethers. A relatively fast rate of monoepoxide addition, favors the preparation of cyclic polyethers. As mentioned above, the rate of monoepoxide addition is primarily a means of controlling reaction temperature. The reaction is very rapid and exothermic. By way of example, in one laboratory experiment the rapid addition of ethylene oxide resulted in an increase in temperature from $-78°$ C. to $+283°$ C. in thirteen seconds.

The linear polyethers prepared according to the claimed process are particularly useful as thickeners.

The invention is further illustrated by reference to the following Illustrative Embodiments, which are given for the purpose of illustration only and are not meant to limit the invention to the particular reactants and conditions employed therein.

Illustrative Embodiment I

The catalyst in Illustrative Embodiment I was prepared by mixing 4 grams (g) of commercial $Ca(BF_4)_2$ with 7.2 g Oxitol ® solvent. The commercial $Ca(BF_4)_2$ comprised 24% water and 76% $Ca(BF_4)_2$. Oxitol ® solvent is the tradename for ethylene glycol monoethyl ether.

The reactor employed was a 100 cc round bottom flask fitted with a teflon stir bar chilled in a dry ice bath. The reactor initially was purged and capped with nitrogen.

To the reactor was added 0.30 g of the above catalyst mixture. Then 28.2 g ethylene oxide was added drop wise. The temperature was maintained at between about $0°$ C. and $+10°$ C. over the 90 minute reaction period. Two brief temperature excursions (2 minutes at $+45°$ C. and 1 minute at $94°$ C.) were experienced.

About 26.0 g of product was obtained. The product, which was stored overnight in a wet ice bath, crystallized resulting in about 21 g solid and 5 g liquid. The solid was filtered, washed with pentane 3 times and then washed with hexane. A GPC analysis (gel permeation chromatography) and GC analysis (gas chromatography) showed no dioxane present and the following molecular weight distribution:
Number Average Molecular Weight ($M_n$)—970
Weight Average Molecular Weight ($M_w$)—1165
Highest Molecular Weight Species ($M_z$)—1400
Q value ($M_w \div M_n$)—1.20

Illustrative Embodiment II

In Illustrative Embodiment II the catalyst was prepared by mixing 4 g $Ca(BF_4)_2$ and 7.2 g Oxitol ® solvent. About 0.32 g of the above catalyst mixture was mixed with 1 ml. diethyl ether and added to the standard reactor. Then 20 g of ethylene oxide was added dropwise while the temperature was maintained at about $-10°$ C. ($\pm 5°$ C.). The resulting product was placed in dry ice over night, then the solid was separated and washed. GPC and GC analysis revealed 1% dioxane and a molecular weight analysis of 1080 $M_n$, 1600 $M_w$, 2390 $M_z$ and a Q value of 1.49.

Illustrative Embodiment III

In Illustrative Embodiment III, a series of experiments were performed in a manner similar to Illustrative Embodiment I. Various catalysts were employed, some in the "wet" state and others in the "dried" state. The wet catalysts typically contained about 50% wt. water.

In each run, the epoxide employed was liquid ethylene oxide. The reaction was started at about $-40°$ C. and exothermed quickly. The exotherm temperature (Te), the time to exotherm (Te-To) and the resulting temperature of the reaction (Tr) are noted in Table 1 along with the time of the run. The product analysis is also noted. The absolute concentration of 1,4-dioxane in the whole sample was determined by GLC analysis. The relative concentrations of 1,4-dioxane, 9-crown-3, 12-crown-4, 15-crown-5, 18-crown-6, and heavier crown ethers were then determined by glc/mass spectral analysis. These relative values were scaled to give the correct (glc determined) absolute 1,4-dioxane concentrations, and mass closure was assumed to be provided by the linear polyether present. Linear polyethers were characterized by GPC. The results are presented in Table 1 and analyzed in Table 2.

TABLE 1

| Catalyst Compound Name | Product LR # | Active Amount Catalyst Used(g) | EO Used (g) | Exotherm Temp-Te (°C.) | Time Te-To (Sec) | Temp of Rxn-Tr | Time of Run | PRODUCT Color | Appearance | Viscosity | Wt(g) |
|---|---|---|---|---|---|---|---|---|---|---|---|
| Ca(BF$_4$)$_2$—XH$_2$O Oxitol | 10-3 | 0.17 | 33.0 | −25 | 1.2 | −50 | 20 sec. | Tan | Transparent | Viscous | 17.39 |
| Sn(BF$_4$)$_2$—XH$_2$O | 24-24 | 0.18 | 30.0 | −16 | 2.4 | −50 | 3.8 min. | Gray | Opaque | Viscous | 20.70 |
| Pb(BF$_4$)$_2$—XH$_2$O | 27-31 | 0.17 | 30.5 | −16 | 4.8 | −45 | 1.7 hr. | Yellow | Opaque | Viscous | 4.92 |
| Cu(BF$_4$)$_2$—XH$_2$O | 33-14 | 0.17 | 31.1 | −17 | 6.0 | −45 | 2.0 hr. | Green | Transparent | Slightly | 18.66 |
| Mg(BF$_4$)$_2$—XH$_2$O | 38-20 | 0.08 | 33.5 | −20 | 3.0 | −45 | 1.5 hr. | Clear | Transparent | No | 18.93 |
| Ca(BF$_4$)$_2$—XH$_2$O | 42-5 | 0.17 | 29.0 | −24 | 3.6 | −58 | 2.0 hr. | Yellow | Transparent | No | 16.13 |
| Co(BF$_4$)$_2$—XH$_2$O | 48-26 | 0.17 | 32.8 | −16 | 4.8 | −45 | 2.1 hr. | Copper | Transparent | No | 9.0 |
| Sn(BF$_4$)$_2$—XH$_2$O | 55-26 | 0.24 | 25.0 | −11 | 4.8 | −49 | 1.8 hr. | White | Opaque | Viscous | 21.17 |
| Ca(BF$_4$)$_2$—dried | 58-22 | 0.17 | 36.4 | −12 | 4.2 | −45 | 2.1 hr. | Tan | Opaque | No | 20.36 |
| Pb(BF$_4$)$_2$—dried | 64-5 | 0.18 | 36.6 | −9 | 3.6 | −45 | 2.0 hr. | White | Opaque | No | 17.24 |
| Al(BF$_4$) | 67-22 | 0.17 | 32.3 | −16 | 3.0 | −49 | 1.5 hr. | Tan | Opaque | No | 23.55 |
| Al(BF$_4$) | 71-26 | 0.17 | 37.6 | −8 | 2.4 | −45 | 2.1 hr. | Clear | Clear | Slightly | 23.7 |
| Ba(BF$_4$)$_2$ | 77-11 | 0.18 | 38.7 | −8 | 2.4 | −43 | 2.0 hr. | Green | Clear | Slightly | 7.9 |
| Cd(BF$_4$)$_2$/H$_2$O | 81-23 | 0.19 | 33.2 | −12 | 3.0 | −45 | 1.9 hr. | Yellow | Clear | No | 6.86 |
| Zn(BF$_4$)$_2$/H$_2$O | 85-22 | 0.18 | 31.4 | −12 | 3.6 | −42 | 2.4 hr. | Yellow | Clear | Viscous | 9.57 |
| Ni(BF$_4$)$_2$/H$_2$O | 93-25 | 0.19 | 29.7 | −14 | 3.6 | −45 | 3.6 hr. | Clear | Clear | Viscous | 3.97 |
| Ba(BF$_4$)$_2$—dried | 99-18 | 0.15 | 28.2 | −20 | 5.4 | −45 | 2.08 hr. | Yellow | Clear | Slightly | 7.52 |
| Li(BF$_4$)$_2$ | 90-4 | 0.18 | 29.7 | −8 | 7.2 | −41 | 1.92 hr. | Clear | Clear | Slightly | 4.31 |
| Cs(BF$_4$) | 104-24 | 0.20 | 34.0 | −10 | 2.4 | −45 | 2.04 hr. | Clear | Clear | Slightly | 10.58 |

| Catalyst Compound Name | GC (%) 1.4 Dioxane | GC - MS (% TOTAL) 1.4 Dioxane | 9-Crown-3 | 12-Crown-4 | 15-Crown-5 |
|---|---|---|---|---|---|
| Ca(BF$_4$)$_2$—XH$_2$O Oxitol | 46.9 | 85.71 | 0.53 | 9.40 | 2.45 |
| Sn(BF$_4$)$_2$—XH$_2$O | 26.76 | 84.79 | 0.82 | 10.09 | 1.89 |
| Pb(BF$_4$)$_2$—XH$_2$O | 13.75 | 33.64 | 0.23 | 53.35 | 8.36 |
| Cu(BF$_4$)$_2$—XH$_2$O | 37.40 | 83.60 | 0.39 | 11.34 | 3.22 |
| Mg(BF$_4$)$_2$—XH$_2$O | 36.6 | 80.16 | 0.42 | 13.71 | 8.87 |
| Ca(BF$_4$)$_2$—XH$_2$O | 47.6 | 72.29 | 0.53 | 21.34 | 3.25 |
| Co(BF$_4$)$_2$—XH$_2$O | 13.5 | 26.56 | 0.19 | 56.20 | 13.26 |
| Sn(BF$_4$)$_2$—XH$_2$O | 43.3 | 83.75 | 1.08 | 10.99 | 2.24 |
| Ca(BF$_4$)$_2$—dried | 29.9 | 29.86 | 0.84 | 58.15 | 6.18 |
| Pb(BF$_4$)$_2$—dried | 19.9 | 14.13 | 0.45 | 73.09 | 7.98 |
| Al(BF$_4$) | 27.1 | 90.13 | 0.49 | 7.43 | 1.12 |
| Al(BF$_4$) | 40.4 | 78.12 | 0.0 | 17.63 | 2.15 |
| Ba(BF$_4$)$_2$ | 7.7 | 11.28 | 0.0 | 78.46 | 4.60 |
| Cd(BF$_4$)$_2$/H$_2$O | 7.8 | 19.87 | 0.0 | 74.19 | 3.73 |
| Zn(BF$_4$)$_2$/H$_2$O | 9.9 | 45.85 | 0.0 | 43.88 | 7.95 |
| Ni(BF$_4$)$_2$/H$_2$O | 13.0 | 18.09 | 0.0 | 66.25 | 11.05 |
| Ba(BF$_4$)$_2$—dried | 12.9 | 14.51 | 0.0 | 63.97 | 6.68 |
| Li(BF$_4$)$_2$ | 12.8 | 13.25 | 0.0 | 76.86 | 7.87 |
| Cs(BF$_4$) | 26.0 | 29.2 | 0.33 | 51.44 | 5.62 |

TABLE 2

| LR # | CATALYST | % CONVERSION | SELECTIVITY TO 18-C-6(%) | 15-C-5(%) | 12-C-4(%) | DIOXANE (%) | APPROXIMATE POLYMER(%) | POLYMER Mn | Mw | Mz | Q |
|---|---|---|---|---|---|---|---|---|---|---|---|
| 16-3 | Ca(BF$_4$)$_2$ 4 H$_2$O/OXITOL | 53 | 1.1 | 1.4 | 5.2 | 47 | 45 | 850 | 1200 | 1740 | 1.41 |
| 24-24 | Sn(BF$_4$)$_2$/H$_2$O | 69 | .8 | .6 | 3.2 | 27 | 68 | 806 | 1121 | 1617 | 1.39 |
| 27-31 | Pb(BF$_4$)$_2$/H$_2$O | 16 | 1.8 | 3.4 | 22 | 14 | 59 | 94 | 1322 | 1926 | 1.45 |
| 33-14 | Cu(BF$_4$)$_2$/H$_2$O | 60 | 0.7 | 1.5 | 5.1 | 37 | 55 | 1366 | 1938 | 2738 | 1.42 |
| 38-20 | Mg(BF$_4$)$_2$/H$_2$O | 57 | 0.9 | 1.8 | 6.3 | 37 | 54 | 1013 | 1423 | 1951 | 1.41 |
| 42-5 | Ca(BF$_4$)$_2$/H$_2$O | 56 | 1.7 | 2.2 | 14.1 | 48 | 34 | 1412 | 1919 | 2640 | 1.36 |
| 48-26 | Co(BF$_4$)$_2$/H$_2$O | 27 | 1.9 | 6.8 | 29 | 14 | 49 | 646 | 802 | 988 | 1.24 |
| 55-26 | Sn(BF$_4$)$_2$/H$_2$O | 85 | 1.0 | 1.2 | 5.7 | 43 | 48 | 1031 | 1559 | 2634 | 1.51 |
| 58-22 | Ca(BF$_4$)$_2$ dry | 56 | 5.0 | 6.2 | 58.2 | 30 | Trace | 780 | 1854 | 3422 | 2.38 |
| 64-5 | Pb(BF$_4$)$_2$ dry | 47 | 4.3 | 8.0 | 73.1 | 20 | Trace | 752 | 1127 | 1563 | 1.50 |
| 77-22 | Al(BF$_4$)$_3$/H$_2$O | 73 | 0.3 | 0.3 | 2.2 | 27 | 70 | 819 | 1233 | 2198 | 1.50 |
| 71-26 | Al(BF$_4$)$_3$/H$_2$O | 63 | 1.1 | 1.1 | 9.2 | 40 | 48 | 1613 | 3168 | 5282 | 1.96 |
| 77-11 | Ba(BF$_4$)$_2$/H$_2$O | 20 | 3.9 | 3.1 | 53.4 | 8 | 32 | 749 | 930 | 1166 | 1.24 |
| 81-23 | Cd(BF$_4$)$_2$/H$_2$O | 21 | 0.9 | 1.5 | 29 | 8 | 61 | 586 | 697 | 825 | 1.15 |
| 85-22 | Zn(BF$_4$)$_2$/H$_2$O | 30 | 0.5 | 1.8 | 9.7 | 10 | 78 | 778 | 966 | 1204 | 1.24 |
| 93-25 | Ni(BF$_4$)$_2$/H$_2$O | 13 | 3.3 | 8.0 | 48 | 13 | 28 | 627 | 839 | 1094 | 1.34 |

TABLE 2-continued

| LR # | CATALYST | % CONVERSION | SELECTIVITY TO | | | | APPROXIMATE POLYMER(%) | POLYMER | | | |
|---|---|---|---|---|---|---|---|---|---|---|---|
| | | | 18-C-6(%) | 15-C-5(%) | 12-C-4(%) | DIOXANE (%) | | Mn | Mw | Mz | Q |
| 99-18 | Ba(BF4)2 dried | 27 | 13.2 | 5.9 | 56.9 | 13 | 11 | 820 | 1088 | 1367 | 1.33 |
| 90-4 | LiBF4 | 15 | 2.0 | 7.6 | 74.3 | 13 | 3 | 780 | 1146 | 1567 | 1.47 |
| 104-24 | Cs(BFhd 4) | 31 | 11.9 | 5.0 | 46 | 26 | 11 | 1311 | 1973 | 2748 | 1.50 |

COMPARATIVE EXAMPLE I

Comparative Example I employed a catalyst comprising about 95% w Ca(BF4)2 and 5% HBF4. The catalyst was prepared by mixing 4 g Ca(BF4)2, 0.4 g HBF4 (50% by weight water), 7.2 g Oxitol® solvent and 1.0 mililiter (ml) diethyl ether. About 0.30 g of the above catalyst mixture was added to the standard reactor of I.E.I. Then 28 g ethylene oxide was added dropwise to the reactor. The reaction temperature was maintained below 0° C. for the first 4 minutes and then below about +10° C. for the next 100 minutes. In order to complete the reaction of the ethylene oxide, the reaction temperature was raised to +25° C. over the next 20 minutes, then raised to +45° C. over the next 13 minutes. Then the sample was removed and washed as in the illustrative embodiments. The solid portion was analyzed by GPC and GC and revealed the presence of 1% dioxane. The molecular weight distribution revealed an $M_n$ of 700; an $M_w$ of 890; an $M_z$ of 1140 and a Q of 1.27. This example showed that the presence of an acid such as HBF4 was not beneficial and, in fact, resulted in the preparation of lower molecular weight polymers.

COMPARATIVE EXAMPLE II

Comparative Example II showed the results obtained with the use of HBF4 in the absence of the salt. The catalyst mixture comprised 6.6 g HBF4, 7.2 g water, 7.2 g Oxitol solvent and 1 ml diethyl ether. About 0.33 g of this catalyst mixture was added to the standard reactor set up. Then 20 g ethylene oxide was added while the temperature was maintained at ±5° C. of −10° C. After fifty minutes the ethylene oxide had reacted. The product was stored in the dry ice bath over night. The resulting solid was filtered, but not washed. A GPC analysis revealed 17.0% dioxane and a molecular weight distribution for the solid of 1030 $M_n$, 1590 $M_w$, 2460 $M_z$ and a Q value of 1.54.

It is significant to note that the catalyst concentration was about 3 to 4 times greater than the catalyst concentration used in Illustrative Embodiment I.

What is claimed is:

1. A process for preparing predominately polymeric linear polyethers having a ratio of weight average molecular weight to number average molecular weight of less than about 1.5, which process comprises:
   (a) adding a salt selected from the group consisting of fluoborate salts of a metal selected from the group consisting of magnesium, aluminum, tin, zinc and calcium to a reaction zone maintained at a temperature of about −78° C. to less than +20° C. in the presence of a hydroxyl-containing compound and in the absence of any additional acid;
   (b) contacting a 1,2-monoepoxide with said salt and said hydroxyl-containing compound in said reaction zone therein forming said linear polyethers; and
   (c) recovering said linear polyethers.

2. The process according to claim 1, wherein the molar ratio between said salt and said hydroxyl-containing compound is between about 40:1 and about 1.5.

3. The process according to claim 2, wherein said hydroxyl-containing compound is selected from the group consisting of ethers, alcohols and water.

4. The process according to claim 3 wherein said hydroxyl-containing compound is ethylene glycol monoethyl ether.

5. The process according to claim 4 wherein said monoepoxide is ethylene oxide.

6. The process according to claim 1, wherein two or more dissimilar epoxides are added to said reaction zone.

7. The process according to claim 1 wherein said linear polyethers are recovered by flashing off the unreacted monoepoxide.

8. The process according to claim 1 wherein said monoepoxide is represented by the formula

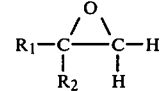

where R1 and R2 are selected from the group consisting of hydrogen, alkyl groups, aryl groups and alkylaryl groups.

9. The process according to claim 8 wherein said monoepoxide is selected from the group consisting of ethylene oxide, propylene oxide and isobutylene oxide.

10. The process according to claim 1 wherein the amount of said salt is between about 0.02 and about 5.0 mole percent based on the amount of monoepoxide.

11. The process according to claim 1 wherein said salt is Ca(BF4)2.

12. The process according to claim 1 wherein said salt is Zn(BF4)2.

13. The process according to claim 12 wherein said monoepoxide is ethylene oxide.

14. The process according to claim 8 wherein said monoepoxide is selected from the group consisting of octene-1 oxide, styrene oxide and phenyl glycidyl ether.

* * * * *